United States Patent [19]

Mundt et al.

[11] 3,807,121

[45] Apr. 30, 1974

[54] METHOD OF EXPANDING A TRANSPARENCY INSERTION SLIT IN A SLIDE FRAME

[75] Inventors: Peter Hans Ernst Mundt, Garmisch Partenkirchen; Otfried Urban, Kochel am See; Arnold Neuhold, Garmisch Partenkirchen, all of Germany

[73] Assignee: Geimuplast Peter Mundt KG, Farchant, Germany

[22] Filed: Nov. 20, 1970

[21] Appl. No.: 91,509

Related U.S. Application Data

[62] Division of Ser. No. 764,469, Oct. 2, 1968, Pat. No. 3,614,854.

[52] U.S. Cl. .................... 53/23, 53/123, 53/381 R
[51] Int. Cl. .................... B65b 17/00, B65b 63/00
[58] Field of Search .......... 53/23, 35, 50, 123, 250, 53/255, 381 R; 156/108, 514; 40/152, 159

[56] References Cited

UNITED STATES PATENTS 3,521,423  7/1970  Koeppe et al. ........................... 53/23
3,530,608  9/1970  Sovia .................................... 40/159

Primary Examiner—Roy Lake
Assistant Examiner—Neil Abrams
Attorney, Agent, or Firm—Fleit, Gipple & Jacobson

[57] ABSTRACT

A slide frame having at least one expansible insertion slit is gripped at its edge portion that is adjacent to the insertion slit and at at least one other portion. At least one portion of the frame is simultaneously or subsequently subjected to a deformation by which the frame portions defining the insertion slit are spaced apart so that the insertion slit is expanded.

8 Claims, 10 Drawing Figures

METHOD OF EXPANDING A TRANSPARENCY INSERTION SLIT IN A SLIDE FRAME

CROSS-REFERENCE TO RELATED APPLICATION

This application is a division of Ser. No. 764,469, filed Oct. 2, 1968, now U.S. Pat. No. 3,614,854.

This invention relates to a method of expanding a transparency insertion slit in a slide frame having at least one expansible insertion slit.

The known methods and apparatus for inserting a transparency into a slide frame are complicated and expensive in manufacture and operation because the transparency must be inserted before the two frame parts are joined.

It is an object of the invention to provide a method and apparatus for inserting a transparency into a resiliently expansible insertion slit of a slide frame having two parts which have previously been joined.

In a method of the kind defined initially this object is accomplished according to the invention in that the frame is gripped at its edge portion that is adjacent to the insertion slit and at at least one other portion, and at least one portion of the frame is simultaneously or subsequently subjected to a deformation by which the frame portions defining the insertion slit are spaced apart so that the insertion slit is expanded. The method according to the invention affords the advantage that the transparency can be inserted into a frame which is ready for use so that the mounting operation is much simplified and reduced in expense.

The present invention is directed to a method and apparatus for mounting a transparency into a slide frame, either by hand or by machine. The present invention has been designed for use with the invention disclosed and claimed in prior application Ser. No. 618,684, filed Feb. 27, 1967, for "Process and Apparatus for Mounting Transparencies" by the applicants herein, now U.S. Pat. No. 3,524,299.

The apparatus for carrying out the method according to the invention by hand is characterized by two noses, which overlie frame edge portions that are disposed laterally of the path on which the transparency is to be inserted, a ramp which is spaced from said noses, and an aperture, which has approximately the same size and form as the picture aperture of the frame and through which the transparency can be gripped. With that end of the slide frame ahead which is nearest to the insertion slit, the slide frame is inserted into the apparatus so that the two noses overlie those frame edge portions which are disposed laterally of the transparency insertion path. The underside of the frame then engages the ramp which is spaced from the noses. Thereafter, the rear portion of the frame is depressed towards the apparatus so that the transparency insertion slit defined by the two frame halves is expanded. The transparency can now be gripped through the aperture and can then be moved into or out of the frame.

The invention provides also a frame which is adapted to be expanded by an apparatus according to the invention. That frame is characterized according to the invention in that one frame half is provided with a closed peripheral edge portion, in which the other frame half, constituting a cover, is embedded, and the joint between the two frame halves ends at least on one side at a distance from an end edge. The cover has preferably at its end an indentation so that the transparency insertion slit is enlarged.

It will be understood that other frames may also be manually expanded on the apparatus according to the invention. For instance, the cover part of the frame may be much smaller in size than the other frame part, in which the cover part is embedded. In other words, the aperture in the larger frame part, which receives the cover on two opposite sides, may be only slightly larger than the aperture which has approximately the same size and form as the picture aperture of the frame whereas the other pair of opposite side edge portions of the cover are parallel to the other frame part on a larger area and the insertion slit is defined on one side by the cover and the other frame part and is expanded by the method according to the invention.

The apparatus according to the invention for carrying out the method according to the invention by machine is characterized in that two opposite guide bars for a transparency are provided, a slide track groove for one frame part is provided below each of said bars, one of said bars is formed with an indentation which is disposed adjacent to the transparency-inserting station of the mounting machine, and a deforming element is provided adjacent to the indentation of said one guide bar. The deforming element may consist of a bar, which rests on the bottom of the slide track and which is bevelled in a direction that is opposite to the feeding direction of the frame. Alternatively, the bar may be recessed into the bottom of the slide track and may be adapted to be raised above the bottom in a vertical plane. Finally, the deforming element may consist of a bevel formed in the bottom of the slide track. In a modification of the apparatus according to the invention, that guide bar which has no indentation is replaced by a hook, which is movable in a vertical plane.

Various embodiments of the invention will be described hereinafter by way of example with reference to the drawing, in which FIG. 1 is a perspective view showing the apparatus which is provided according to the invention for carrying out the method according to the invention by hand, without a slide frame.

FIGS. 3–5 are perspective views showing three different embodiments,

FIG. 6 is a diagram illustrating the operation of a mounting machine provided with an apparatus according to the invention, FIGS. 7 and 8 show another embodiment in FIG. 7 before and in FIG. 8 during the expansion of the frame, and FIGS. 9 and 10 show a further embodiment in FIG. 9 before and in FIG. 10 during the expansion.

Figure 1:
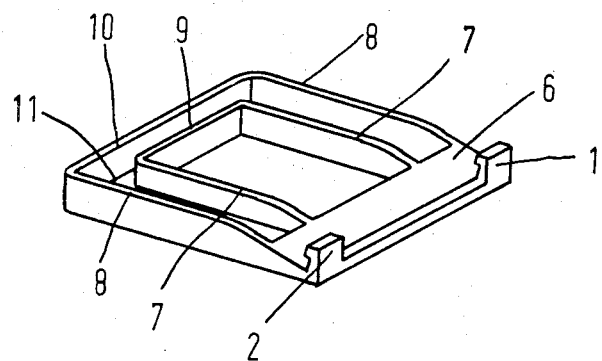
Figure 2:
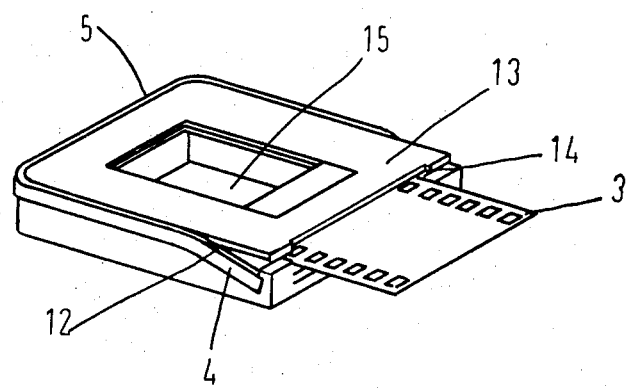
FIG. 2 shows the same apparatus provided with a frame.

The apparatus for carrying out the method according to the invention by hand comprises two noses 1, 2. As is apparent from FIG. 2, these noses can overlie those frame edge portions of one frame half 4 of a slide frame 5 which are laterally disposed of the path for the insertion of a transparency 3. A ramp 6 is spaced from said noses 1, 2. As is apparent from FIG. 1, the ramp 6 comprises a rearwardly and upwardly inclined surface, which precedes the noses 1, 2 and is at least as wide as the frame 5, and bars 7, 8, 7', 8', which succeed said surface and arcuately merge from the same into a horizontal plane. The bars 7, 7' and 8, 8' are interconnected at the rear by cross-bars 9, 10. All bars are joined in a U-shaped configuration by a common bottom 11.

The dimensions of the apparatus are approximately the same as those of the transparency frame which has an insertion slit that is to be expanded on the apparatus. In the frame shown in FIG. 2, one frame half 4 is provided with a closed peripheral edge portion 12 and the other frame half 13, constituting a cover, is embedded in said frame. The two frame halves 4, 13 are joined by ultrasonic welding. At least at that end of the frame at which the transparency 3 is to be inserted, the end of the resulting joint is spaced from the associated end edge of one frame half by a distance which is readily apparent from FIG. 2. The cover 13 is provided at its end with an indentation 14.

When it is desired to expand the frame by hand, the closed peripheral edge portion 12 of one frame half 4 at one end thereof is placed under the noses 1, 2. The slide frame then contacts the ramp 6 and extends angularly in the apparatus. When that part of the frame 5 which is apparent from FIG. 2 and opposite to the insertion slit is caused to engage the bars 7, 7', 8, 8', 9, 10, the cover 13 will be detached from the other frame half 4, as is apparent from FIG. 2, and the transparency 3 can now be moved into or out of the frame by hand without risk of scratching the picture portion of the transparency. The transparency 3 can be moved out of the frame 5 through the aperture 15, which has the same size and form as the picture aperture of the frame.

Figure 3:
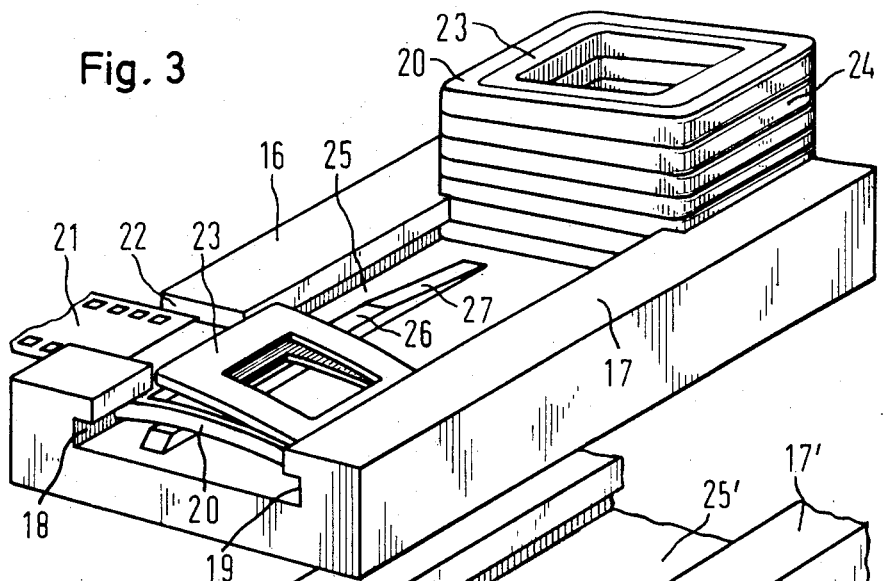
FIGS. 3 to 10 show apparatus for carrying out the method according to the invention by machine.
Figure 4:
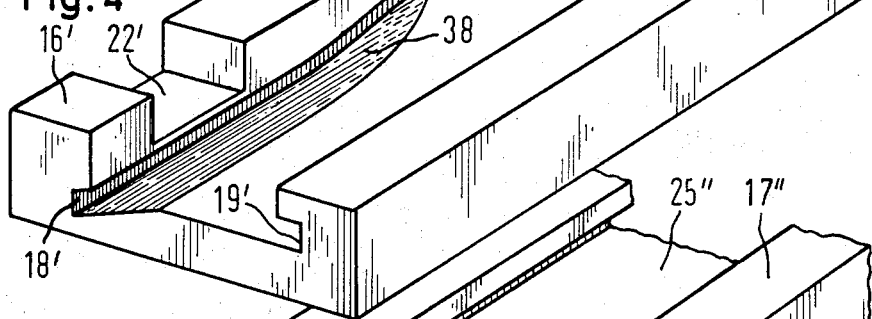
Figure 5:
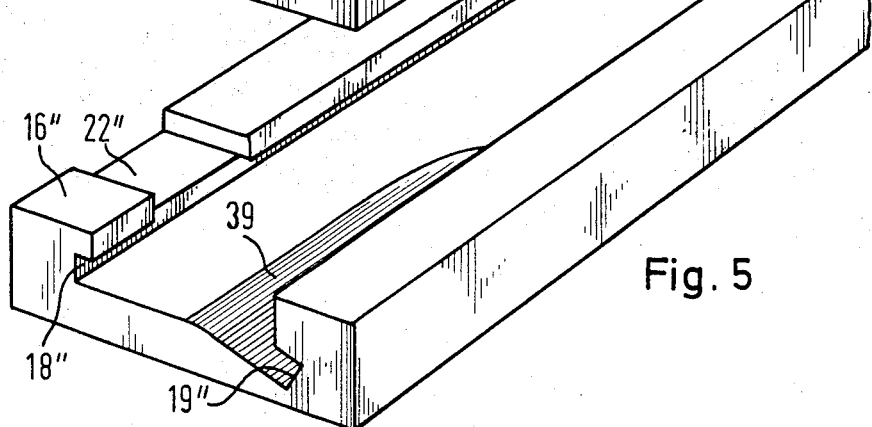

The various apparatus shown in FIGS. 3 to 5 for carrying out the method according to the invention by machine have all two opposite guide bars 16, 17 or 16', 17' or 16'', 17''. A slide track groove 18, 19 or 18', 19' or 18'', 19'' for one frame part 20 is disposed below each guide bar. Adjacent to the station where the film 21 is inserted in the mounting machine, which station is particularly apparent from FIGS. 3 and 6, one guide bar 16 or 16' or 16'' has an indentation 22, 22' or 22'' to facilitate the insertion of the transparency film 21 into the frame 24 consisting of the parts 20, 23. In the embodiment of FIG. 3, a bar 26 disposed at the bottom 25 of the slide track is provided adjacent to the indentation 22, 22' or 22'' and is bevelled at 27 in a direction which is opposite to the feeding direction of the frame.

Figure 6:
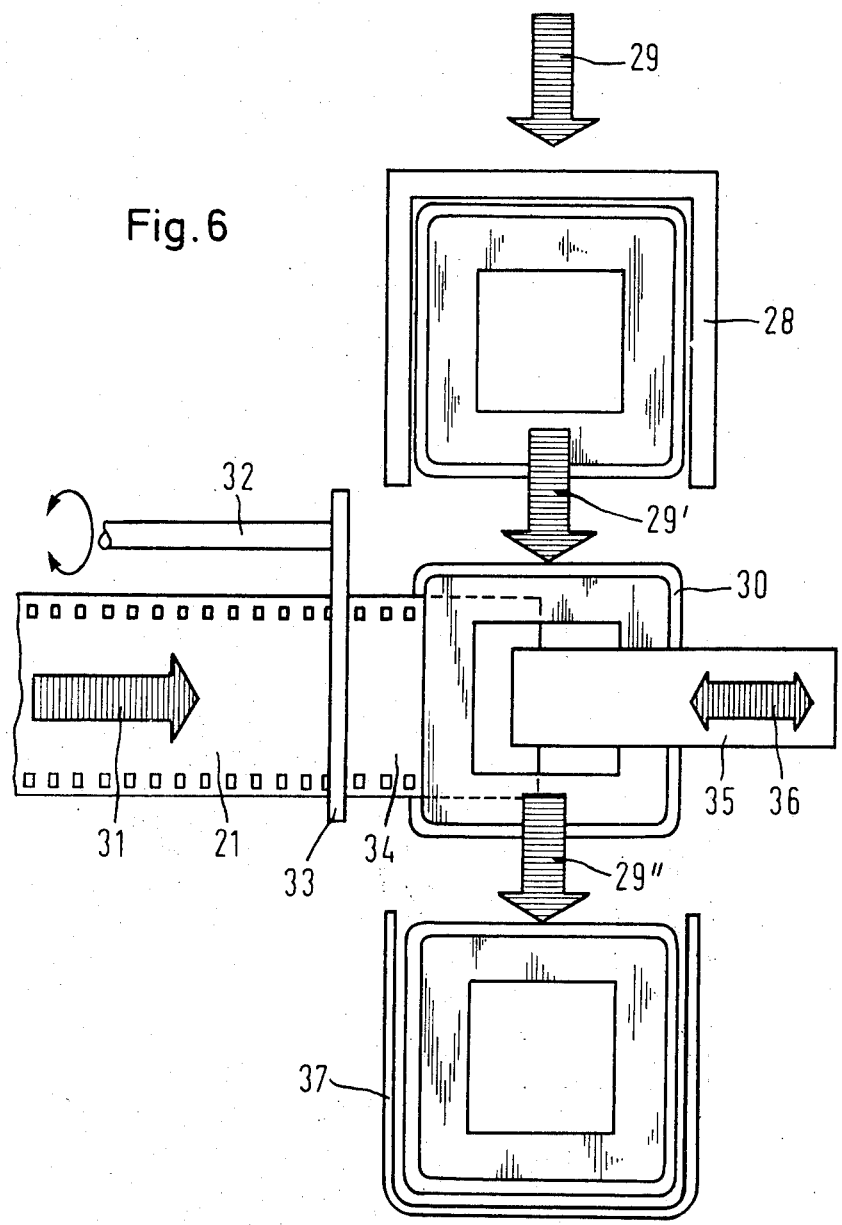

It will be described hereinafter how the method according to the invention is carried out on the apparatus according to FIG. 3. To facilitate the understanding, reference is also made to the diagram of FIG. 6 illustrating the operation of a mounting machine, which has been described in the above-mentioned prior application. The frames to be provided with transparencies are stacked at 28 and are fed by means of a pusher in the direction of the arrows 29, 29', 29'' to enter the inserting station of the mounting machine. The frame 30 is disposed in that station. At this time, the transparency is still a portion of the integral film strip 21 and is fed in the direction of the arrow 31. In this embodiment, the insertion station is also the severing station, where a severing knife 33 is provided, which is pivotally movable about a shaft 32. The severed transparency 34 is gripped by a diagrammatically shown gripper 35, which is movable in the direction of the double arrow 36 to pull the transparency 34 entirely into the frame 30 through the indentation 22, which is apparent from FIG. 3. The gripper 35 is subsequently returned to its initial position in order to subsequently insert the next transparency severed from the film strip 21. The frame 30 containing the transparency is fed in the direction of the arrow 29'' into the station 37, from which the frames containing the transparencies can be removed and can subsequently be despatched.

It is readily apparent from FIG. 3 that the frame moving from the stacking station to the inserting and severing station is riding up on the inclined ramp 27 of the bar 26. The frame moving through the mounting machine is thus gripped at two opposite edge portions by the guide bars 16, 17. The bar 26 subjects the frame 24 or 30 to a deformation by which the frame portions 20, 23 defining the insertion slit are spaced apart and the insertion slit is expanded so that the transparency 34 or the film strip 21 can be inserted into the frame. This is particularly apparent from FIG. 6.

The apparatus shown in FIG. 4 differs from that shown in FIG. 3 only in that the bottom 25' rather than the bar 26 is bevelled toward the indentation 22' so that the slide track groove 18' of the guide bar 16' is on a lower level adjacent to the bevel 38 than the opposite slide track groove 19' of the buide bar 17'. It will be understood that a transparency frame being fed in the slide track in accordance with the diagram of FIG. 6 is gripped at its edge portion which is adjacent to the insertion slit and at its opposite edge portion, and a frame part which corresponds to the frame part 20 in FIG. 4 is simultaneously subjected to a deformation such as is apparent from FIG. 8, which will be explained hereinafter. Thus, the frame portions which define the insertion slit are spaced apart by a distance shown also in FIG. 8 and the insertion slit is expanded.

The apparatus shown in FIG. 5 differs from that shown in FIG. 4 only in that the bottom 25'' has a bevel 39 in the opposite direction so that the slide track groove 19'' of the guide bar 17'' is on a lower level than the slide track groove 18'' of the guide bar 16''. This apparatus can also be used to carry out the method according to the invention.

Figure 7:
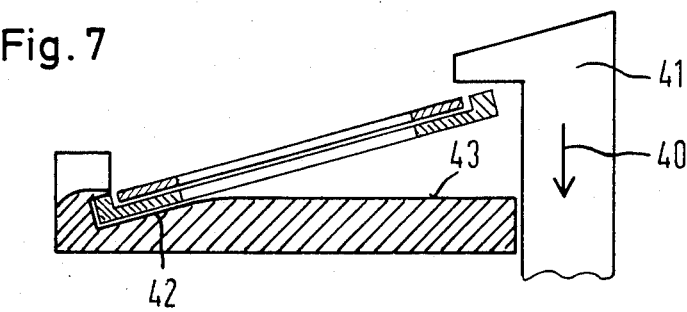
Figure 8:
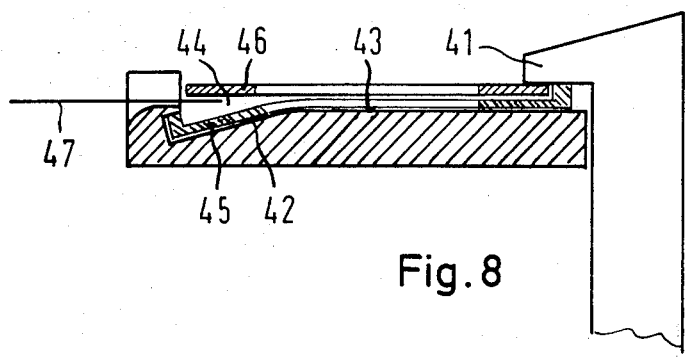

The apparatus shown in FIGS. 7 and 8 differs from the apparatus shown in FIG. 4 only in that the stationary guide bar 17' is replaced by a hook 41, which is movable in a vertical plane indicated by the arrow 40. When the hook 41 is moved from its position in FIG. 7 to that shown in FIG. 8, the frame is gripped at its edge portion adjacent to the insertion slit and at its opposite edge portion and the embedding frame portion is subjected to a deformation by a bevel 42 of the bottom 43 of the slide track so that the frame portions 45, 46 defining the insertion slit are spaced apart by a distance 44 shown in FIG. 8 and the insertion slit is expanded for the insertion of the transparency 47 without risk of scratching.

Figure 9:
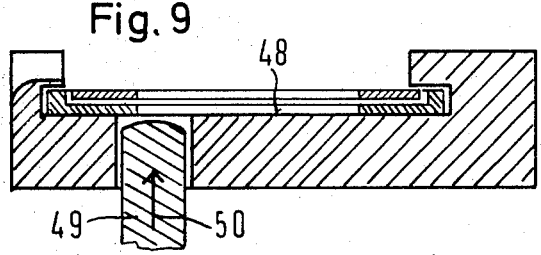
Figure 10:
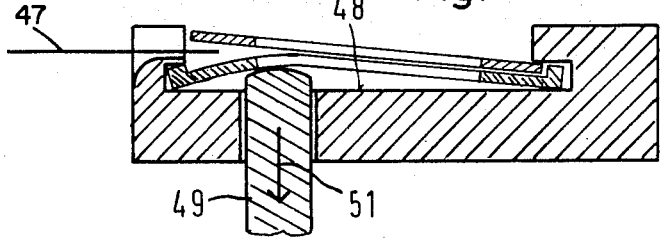

The apparatus shown in FIGS. 9 and 10 differs from that shown in FIG. 3 in that a bar 49 is recessed in the bottom 48 of the slide track and is movable in a vertical plane in the direction of the arrows 50 and 51 so that the bar can be raised above the bottom 48 of the slide track, as is shown in FIG. 10. It is readily apparent from the drawing that this apparatus can also be used to carry out the method according to the invention.

What is claimed is:

1. An apparatus for mounting a transparency into a slide frame having two frame parts which on deformation will separate to form an insertion opening for said transparency, said apparatus comprising two opposed guide bars, a slide track groove for one of said frame parts provided below each of said guide bars, a slide track connecting said slide track grooves, and a bar positioned in the path of said slide frame and sloped towards the slide track in a direction that is opposite to the feeding direction of said slide frame so that when said slide frame is fed in said slide track grooves said frame parts are separated to form said insertion opening.

2. An apparatus for mounting a transparency into a slide frame having two frame parts which on deformation will separate to form an insertion opening for said transparency, said apparatus comprising two opposed guide bars, a slide track groove for one of said frame parts provided below each of said guide bars, a slide track connecting said slide track grooves, and a bar recessed in the bottom of said slide track and adapted to be raised above said bottom in a vertical plane so that when said slide frame is fed in said slide track grooves said frame parts can be separated to form said insertion opening.

3. An apparatus for mounting a transparency into a slide frame having two frame parts which on deformation will separate to form an insertion opening for said transparency, said apparatus comprising two opposed guide bars, a slide track groove for one of said frame parts provided below each of said guide bars, and a slide track connecting said slide track grooves, one of said slide track grooves being at a lower level than the other groove so that when said slide frame is fed in said slide track grooves said frame parts are separated to form said insertion opening.

4. The apparatus of claim 3 in which one of said guide bars is a hook which is movable in a vertical plane for facilitating said separation of said frame parts to form said insertion opening.

5. A method of mounting a transparency into a slide frame having two frame parts which on deformation will separate to form an insertion opening for said transparency, comprising the steps of feeding said frame in a slide track groove provided below each of two opposed guide bars to a mounting station, deforming said slide frame by positioning a bar in the path of said slide frame which is sloped towards a slide track connecting said slide track grooves in a direction that is opposite to the feeding direction of said slide frame so that when said slide frame is fed in said slide track grooves said frame parts are separated to form said insertion opening, feeding said transparency while still an integral portion of a film strip into said mounting station, severing said transparency from said film strip in said mounting station, gripping said severed transparency and moving it into said frame while said frame is subjected to said deformation and while said frame parts are separated to form said insertion opening for said transparency.

6. A method of mounting a transparency into a slide frame having two frame parts which on deformation will separate to form an insertion opening for said transparency, comprising the steps of feeding said frame in a slide track groove provided below each of two opposed guide bars to a mounting station, deforming said slide frame by positioning a bar in a recess in the bottom of a slide track connecting said slide track grooves and raising said bar above said bottom in a vertical plane when said slide frame is fed in said slide track grooves so that said frame parts are separated to form said insertion opening, feeding said transparency while still an integral portion of a film strip into said mounting station, severing said transparency from said film strip in said mounting station, gripping said severed transparency and moving it into said frame while said frame is subjected to said deformation and while said frame parts are separated to form said insertion opening for said transparency.

7. A method of mounting a transparency into a slide frame having two frame parts which on deformation will separate to form an insertion opening for said transparency, comprising the steps of feeding said frame in a slide track groove provided below each of two opposed guide bars to a mounting station, deforming said slide frame by positioning one of said slide track grooves at a lower level than the other groove so that when said slide frame is fed in said slide track grooves, said frame parts are separated to form said insertion opening, feeding said transparency while still an integral portion of a film strip into said mounting station, severing said transparency from said film strip in said mounting station, gripping said severed transparency and moving it into said frame while said frame is subjected to said deformation and while said frame parts are separated to form said insertion opening for said transparency.

8. The method of claim 7 in which said deformation is caused by moving one of said guide bars in a vertical plane relative to the other of said guide bars when said slide frame is fed in said slide track grooves to said mounting station.

* * * * *